United States Patent
Jiang et al.

(10) Patent No.: US 11,860,802 B2
(45) Date of Patent: Jan. 2, 2024

(54) INSTANT RECOVERY AS AN ENABLER FOR UNINHIBITED MOBILITY BETWEEN PRIMARY STORAGE AND SECONDARY STORAGE

(71) Applicant: Nutanix, Inc., San Jose, CA (US)

(72) Inventors: Dezhou Jiang, San Jose, CA (US); Kiran Tatiparthi, Dublin, CA (US); Monil Devang Shah, Milpitas, CA (US); Mukul Sharma, San Jose, CA (US); Prakash Narayanasamy, San Jose, CA (US); Praveen Kumar Padia, Fremont, CA (US); Sagi Sai Sruthi, Bengaluru (IN); Deepak Narayan, Bengaluru (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/676,013

(22) Filed: Feb. 18, 2022

(65) Prior Publication Data

US 2022/0309010 A1   Sep. 29, 2022

(30) Foreign Application Priority Data

Feb. 22, 2021  (IN) .............................. 202141007358

(51) Int. Cl.
*G06F 13/16*  (2006.01)
*G06F 13/40*  (2006.01)

(52) U.S. Cl.
CPC ...... *G06F 13/1668* (2013.01); *G06F 13/4004* (2013.01)

(58) Field of Classification Search
CPC ............. G06F 13/1668; G06F 13/4004; G06F 3/0661; G06F 3/0664; G06F 11/1446
See application file for complete search history.

(56) References Cited

U.S. PATENT DOCUMENTS

| 8,549,518 | B1 | 10/2013 | Aron et al. |
| 8,850,130 | B1 | 9/2014 | Aron et al. |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Idriss N Alrobaye
*Assistant Examiner* — Ronald T Modo
(74) *Attorney, Agent, or Firm* — Foley & Lardner LLP (57) ABSTRACT

In accordance with some aspects of the present disclosure, a non-transitory computer readable medium is disclosed. In some embodiments, the non-transitory computer readable medium includes instructions that, when executed by a processor, cause the processor to receive, from a workload hosted on a host of a cluster, first I/O traffic programmed according to a first I/O traffic protocol supported by a cluster-wide storage fabric exposed to the workload as being hosted on the same host. In some embodiments, the workload is recovered by a hypervisor hosted on the same host. In some embodiments, the non-transitory computer readable medium includes the instructions that, when executed by the processor, cause the processor to adapt the first I/O traffic to generate second I/O traffic programmed according to a second I/O traffic protocol supported by a repository external to the storage fabric and forward the second I/O traffic to the repository.

24 Claims, 5 Drawing Sheets

(56) References Cited

U.S. PATENT DOCUMENTS

| | | | |
|---|---|---|---|
| 9,436,555 | B2 | 9/2016 | Dornemann et al. |
| 9,659,017 | B2 | 5/2017 | Sorenson et al. |
| 11,442,768 | B2 | 9/2022 | Kumar |
| 11,487,468 | B2 | 11/2022 | Gupta et al. |
| 2014/0366155 | A1 | 12/2014 | Chang et al. |
| 2015/0074054 | A1* | 3/2015 | Antony ................ G06F 16/128 |
| | | | 707/639 |
| 2015/0378831 | A1 | 12/2015 | Tarasuk-Levin et al. |
| 2016/0048408 | A1 | 2/2016 | Madhu et al. |
| 2018/0157444 | A1* | 6/2018 | Franciosi ................ G06F 3/067 |
| 2019/0179805 | A1 | 6/2019 | Prahlad et al. |
| 2021/0263721 | A1* | 8/2021 | Liu ....................... G06F 9/5077 |
| 2022/0043608 | A1 | 2/2022 | Karamanolis et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

VMware, "Disaster Recovery as-a-Service using VMware Site Recovery with VMware Cloud on AWS," pp. 1-4.

VMware, "VMware VSAN Disaster Recovery," https://core.vmware.com/resource/vsan-disaster-recovery#sec10254-sub1, pp. 1-5.

* cited by examiner

INSTANT RECOVERY AS AN ENABLER FOR UNINHIBITED MOBILITY BETWEEN PRIMARY STORAGE AND SECONDARY STORAGE

CROSS-REFERENCE TO RELATED APPLICATION

This application is related to and claims priority under 35 U.S.C. § 119(a) from Indian Provisional Application No. 202141007358, filed Feb. 22, 2021, titled "INSTANT RECOVERY AS AN ENABLER FOR UNINHIBITED MOBILITY BETWEEN PRIMARY STORAGE AND SECONDARY STORAGE," the entire contents of which are incorporated herein by reference for all purposes.

BACKGROUND

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present-day virtual computing systems have limitations due to their configuration and the way they operate.

SUMMARY

The disclosure relates generally to hyperconverged infrastructure and, more particularly, to systems and methods for instant recovery in a hyperconverged infrastructure.

In accordance with some aspects of the present disclosure, a non-transitory computer readable medium is disclosed. In some embodiments, the non-transitory computer readable medium includes instructions that, when executed by a processor, cause the processor to receive, from a workload hosted on a host of a cluster, first I/O traffic programmed according to a first I/O traffic protocol supported by a cluster-wide storage fabric exposed to the workload as being hosted on the same host. In some embodiments, the workload is recovered by a hypervisor hosted on the same host. In some embodiments, the non-transitory computer readable medium includes the instructions that, when executed by the processor, cause the processor to adapt the first I/O traffic to generate second I/O traffic programmed according to a second I/O traffic protocol supported by a repository external to the storage fabric and forward the second I/O traffic to the repository.

In accordance with some aspects of the present disclosure, an apparatus is disclosed. In some embodiments, the apparatus includes a processor and memory. In some embodiments, the memory includes programmed instructions that, when executed by the processor, cause the apparatus to receive, from a workload hosted on a host of a cluster, first I/O traffic programmed according to a first I/O traffic protocol supported by a cluster-wide storage fabric exposed to the workload as being hosted on the same host. In some embodiments, the workload is recovered by a hypervisor hosted on the same host. In some embodiments, the memory includes the programmed instructions that, when executed by the processor, cause the apparatus to adapt the first I/O traffic to generate second I/O traffic programmed according to a second I/O traffic protocol supported by a repository external to the storage fabric and forward the second I/O traffic to the repository.

In accordance with some aspects of the present disclosure, a method is disclosed. In some embodiments, the method includes receiving, from a workload hosted on a host of a cluster, first I/O traffic programmed according to a first I/O traffic protocol supported by a cluster-wide storage fabric exposed to the workload as being hosted on the same host. In some embodiments, the workload is recovered by a hypervisor hosted on the same host. In some embodiments, the method includes adapting the first I/O traffic to generate second I/O traffic programmed according to a second I/O traffic protocol supported by a repository external to the storage fabric and forward the second I/O traffic to the repository.

In accordance with some aspects of the present disclosure, a non-transitory computer readable medium is disclosed. In some embodiments, the non-transitory computer readable medium includes instructions that, when executed by a processor, cause the processor to receive an indication of an external repository hosting a virtual machine image, power-on a virtual machine, and attach the virtual machine image to the virtual machine.

In accordance with some aspects of the present disclosure, an apparatus is disclosed. In some embodiments, the apparatus includes a processor and memory. In some embodiments, the memory includes programmed instructions that, when executed by the processor, cause the apparatus to receive an indication of an external repository hosting a virtual machine image, power-on a virtual machine, and attach the virtual machine image to the virtual machine.

In accordance with some aspects of the present disclosure, a method is disclosed. In some embodiments, the method includes receiving an indication of an external repository hosting a virtual machine image, powering-on a virtual machine, and attaching the virtual machine image to the virtual machine.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

In embodiments lacking the improvements described herein, in which disk data of a workload such as an application of a virtual machine or container is external to a system that the workload, virtual machine, container, or volume group is running on, the system must move disk data into an underlying storage of the system in order to recover the workload, virtual machine, container, or volume group from the disk data. This arrangement needlessly consumes a lot of time, CPU cycles, and storage resources.

Herein, in some embodiments, instant recovery refers to immediately restoring one or more workloads, virtual machines, containers, or volume groups by running the one or more workloads, virtual machines, containers, or volume groups from remote storage. The remote storage may include, but is not limited to, backup storage or files that are used for disaster recovery.

In other embodiments lacking the improvements described herein, instant recovery is done without a hyper-converged infrastructure (HCI). Specifically, instant recovery can be done by mounting a network file system (NFS) export surfaced by the backup software as a data store on a host of a non-HCI hypervisor and booting the virtual machine from the non-HCI hypervisor. A separate software is used to move the virtual machine to the data store backed by the primary server.

Herein, in some embodiments, a hyper-converged infrastructure (HCI) refers to compute resources (e.g., tightly) coupled to storage resources. In some embodiments, the HCI is a hypervisor (e.g., a software component) that is (e.g., tightly) coupled to a virtual disk controller (e.g., a software component). The hypervisor can provide (e.g., an abstraction for, virtualized, etc.) compute resources for workloads, substrates (e.g., VMs or containers), or both, and the virtual disk controller, which can be part of the distributed storage fabric, can provide (e.g., an abstraction for, virtualized, etc.) storage resources of the distributed storage fabric for the workloads, substrates, or both. Tightly coupled herein may refer to binding resources, or software controlling the resources, to a particular use case, a specific instance, a specific frontend, or, more generally, a specific purpose or function. In some embodiments, a native or proprietary protocol may be used to communicate between the hypervisor and the virtual disk controller. Each host on the cluster can include a hypervisor and a virtual disk controller. The virtual disk controller can expose the storage fabric (e.g., the storage resources) as being hosted on the same host that the workload or the substrate is hosted on. The compute and storage resources that are provided can be available cluster wide. Thus, the HCI can scale as more hosts are added, with data distributed across the storage resources of the cluster.

Disclosed herein are embodiments of systems and methods for instantly recovering workloads (e.g., an application hosted on a substrate, wherein the substrate is either a virtual machine or a container), virtual machines, containers, or volume groups, workload disks, virtual machine disks, or container disks on the HCI from secondary storage. In some embodiments, I/O traffic is translated from a first protocol supported by the HCI to a second protocol supported by the secondary storage. In some embodiments, I/O traffic is forwarded to the secondary storage. In some embodiments, I/O traffic is absorbed locally. In some embodiments, data is brought in as demanded by the running workload or based on a background migration policy.

Advantageously, embodiments disclosed herein enable near-zero-recovery time objective (RTO) recovery from any storage that can surface a workload disk, virtual machine disk, container disk, or volume group as a data source (e.g., over NFSv3 or S3), including third party backup repositories, turkey solutions (e.g., Nutanix Mine), or Amazon Snowball-like appliances. Passthrough instant recovery enables testing a product before moving full-scale and performing quick sanity checks before upgrading a product instance of an application. Passthrough instant recovery can be used to instantly create workloads virtual machines, containers, or volume groups based off images, alleviating the need for having to comply images to individual clusters.

Moreover, in some embodiments, database copy-and-paste operations (e.g., Era time machines) are no longer limited by the snapshots that are locally available. This model can allow for centralized administration of gold images and alleviates the need for having to copy images to individual clusters.

In addition, instant recovery can be a complementary feature with disaster recovery (e.g., long-term storage service). Workload disks, virtual machine disks, container disks, or volume groups can be received and stored in a third-party/cloud storage system like S3. During a disaster recovery event, the workload disks, virtual machine disks, container disks, or volume groups can be instantly recovered from snapshots stored in a third-party/cloud storage system.

Figure 1:
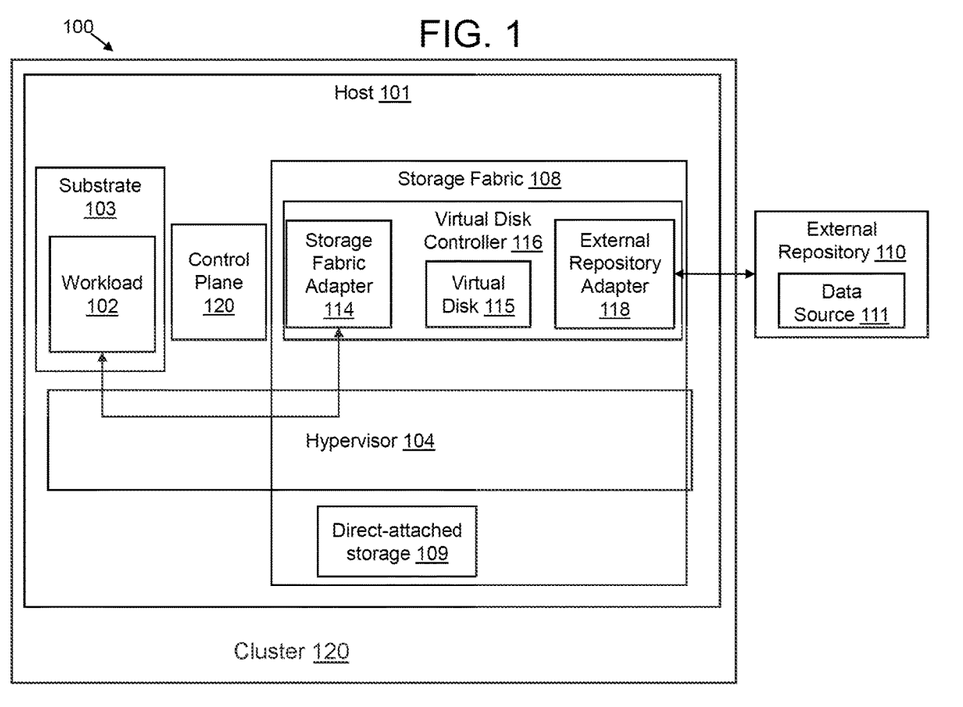
FIG. 1 is an example block diagram of a network environment, in accordance with some embodiments of the present disclosure.

FIG. 1 is an example block diagram of a network environment 100, in accordance with some embodiments of the present disclosure. The network environment 100 includes a host 101 (e.g., node, computer, machine). The host 101 may be a part of a cluster 105 of nodes with access to a pool of resources (e.g., storage resources, compute resources). In some embodiments, the host 101 is an HCI host. The host 101 can be part of an HCI or HCI cluster. The host 101 includes one or more workloads such as workload 102 (e.g., application or service). The workload 102 can be hosted on a substrate 103. The substrate 103 can be a virtual machine (VM) or a container. The host 101 includes a hypervisor 104 in communication with the workload 102 and a storage fabric 108. In some embodiments, the workload 102 is running on (e.g., receiving compute resources from) the hypervisor 104. In some embodiments, the hypervisor 104 launches/powers on the workload 102 or the VM/container hosting the workload 102 irrespective of whether the workload 102 has access (e.g., local access) to disk data of the workload disk data, virtual machine disk data, container disk data, or volume group data. In some embodiments, the hypervisor launches/powers on the workload 102 or the VM/container hosting the workload 102 before the workload 102 has received (e.g., all of) disk data (e.g., workload disk/image, virtual machine disk/image, container disk/image, volume group) from the data source 111 of the external repository 110.

The network environment 100 includes a storage fabric 108, which may be referred to as a data plane. The storage fabric 108 may be distributed across a cluster 105 of hosts including the host 101. The storage fabric may include, but is not limited to, non-volatile memory (NVM) such as non-volatile dual in-line memory modules (NVDIMM), storage devices, optical disks, smart cards, solid state devices, etc. The storage fabric 108 can be shared with the cluster 105 of hosts. In some embodiments, the storage fabric 108 includes direct-attached storage 109. In some embodiments, the storage fabric 108 includes network-attached-storage such as a storage array network (SAN). The network-attached storage may be storage hosted on a different host than host 101. In some embodiments, the storage fabric 108 includes direct-attached storage 109 and network-attached storage.

The storage fabric 108 includes a virtual disk controller 116 (e.g., a controller virtual machine, a controller container, an independent service, distributed storage fabric component, distributed storage fabric operating system, etc.). In some embodiments, the virtual disk controller 116 instantly recovers the workload/VM/container/volume group even though the disk data for the workload/VM/container/volume group is not locally available in the underlying cluster 105 (e.g., the host 101 and/or a plurality of hosts, the storage fabric 108). In some embodiments, the virtual disk controller 116 live migrates disk data to the cluster 105 without interrupting the recovered workload/VM/container.

In some embodiments, the virtual disk controller 116 includes instructions that, when executed by a processor associated with the virtual disk controller 116, manages (e.g., adapts, converts, translates, generates, forwards, encapsulates, de-encapsulates, etc.) input/output (I/O) traffic such as read requests, write requests, and responses to read/write requests. In some embodiments, the I/O traffic is in accordance with internet small computer systems interface (iSCSI) protocol/format. In some embodiments, the I/O traffic is in accordance with a native or proprietary (e.g., HCI) protocol/format. In some embodiments, the virtual disk controller 116 determines whether a destination of the I/O traffic is the storage fabric 108 or the external repository 110.

The virtual disk controller 116 includes a storage fabric adapter 114. In some embodiments, the I/O traffic is received at the storage fabric adapter 114. In some embodiments, the I/O traffic is in accordance with internet small computer systems interface (iSCSI) protocol/format. In some embodiments, the storage fabric adapter 114 terminates the I/O traffic. In some embodiments, the storage fabric adapter 114 strips/removes/de-encapsulates protocol-related information (e.g., headers protocol-specific commands). In some embodiments, one of the storage fabric adapter 114 translates the I/O traffic from an iSCSI protocol/format to a HCI-native protocol/format.

The virtual disk controller 116 includes a virtual disk 115. The storage fabric adapter 114 forwards the I/O traffic to the virtual disk 115. The virtual disk 115 can be a logical storage that is mapped to, backed by, abstracted from, or exposed from direct-attached storage 109. The virtual disk controller 116 can deflect/forward the I/O traffic from the virtual disk 115 to the external repository adapter 118.

The virtual disk controller 116 includes an external repository adapter 118. In some embodiments, the external repository adapter 118 is interposed on the I/O path between the virtual disk 115 and the external repository 110. In some embodiments, the external repository adapter 118 receives the I/O traffic from the virtual disk (vdisk) controller 116 (e.g., via the virtual disk 115). In some embodiments, the external repository adapter 118 adapts the I/O traffic to support communication of the I/O traffic with the external repository 110. For example, the external repository adapter 118 adapts the I/O traffic to include protocol/format-type (e.g., NFS) primitives (e.g., read, write, and an indicator to determine a suitable 10 size to use for reading and writing). In some embodiments, the external repository adapter 118 forwards the adapted I/O traffic to the external repository 110. In some embodiments, the vdisk controller 116 or the external repository adapter 118 can map the virtual disk 115 a data source 111 of the external repository 110. In some embodiments, the vdisk controller 116 or the external repository adapter 118 writes to or reads from the virtual disk 115 mapped to the data source 111.

The network environment 100 includes an external repository 110. An external repository 110 is one or more storages/storage facilities/data sources, such as the data source 111, that are external to the storage fabric 108 and the cluster 105 of hosts and that is managed by a third party. In some embodiments, the external repository 110 is one or more of a network file system (NFS) export, a server message block (SMB) share, a simple storage service (S3) bucket, etc. In some embodiments, the external repository 110 surfaces disks over different storage protocols (e.g., NFSv3, NFSv4, S3, or some proprietary application programming interface or API, etc.)

An administrator (e.g., cluster administrator or virtualization administrator) of the cluster can create/specify/enable access to an external repository 110 through a first API call/command. The administrator can issue the first API call via a client device (e.g., the workload 102, the hypervisor 104, the software stack 106, or anywhere on the host 101 where the API is being hosted). The administrator can specify/assign an identifier (e.g., name) to the external repository 110. The administrator can specify a server where the external repository 110 is located. The administrator can specify a representation of the external repository 110 (e.g., a path of an NFS export, etc.).

The administrator (e.g., virtualization administrator or backup administrator) or a privileged user (e.g., a user with privileges to create and update a workload configuration) can create/launch/power on a workload and attach the data source 111 as a virtual disk to the workload 102 through a second API call. The administrator or privileged user can specify a uniform resource locator (URL) of the data source 111. The URL can be used to read from and write to the data source 111. The administrator or privileged user can specify a virtual disk, including one or more of a VM disk universally unique identifier (UUID), a device index, a device protocol, an NFS file path, or a volume group UUID. In some embodiments, the second API call can specify the virtual disk as a passthrough or a fast clone, which will be discussed below. The control plane 120, discussed below, can service the first and second API calls. In some embodiments, the second API call can be integrated/combined with the first API call.

Figure 2:
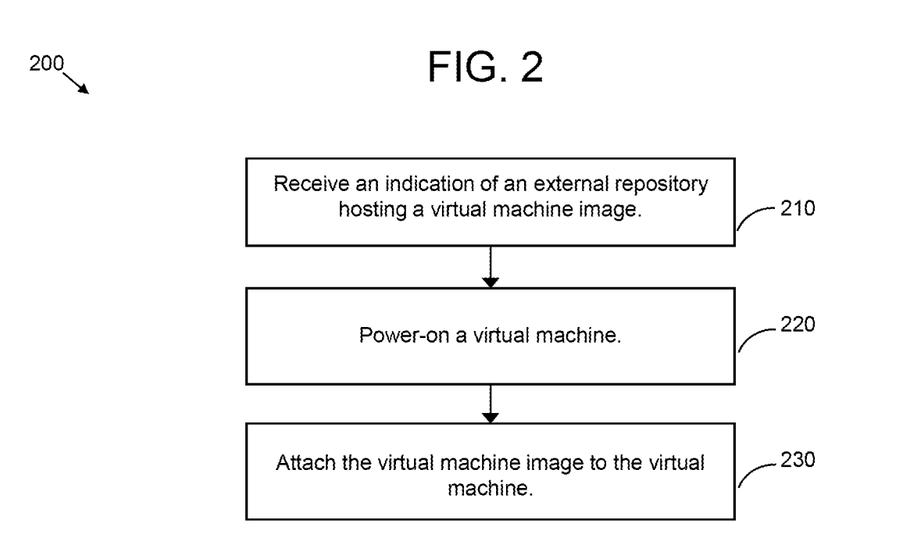
FIG. 2 is a flowchart of an example method is illustrated, in accordance with some embodiments of the present disclosure.

Referring now to FIG. 2, a flowchart of an example method 200 is illustrated, in accordance with some embodiments of the present disclosure. The method 200 may be implemented using, or performed by, the network environment 100, one or more components of the network environment 100, a processor associated with the network environment 100, or a processor associated with the one or more components of network environment 100. Additional, fewer, or different operations may be performed in the method 200 depending on the embodiment.

A processor (e.g., the workload 102, the hypervisor 104, the software stack 106, or anywhere on the host 101) receives an indication of/specifies/identifies an external repository (e.g., the external repository 110) hosting a virtual machine image (e.g., virtual machine disk, virtual machine disk image), at operation 210. In some embodiments, the virtual machine image is included in the data source. In some embodiments, the virtual machine image is a data source.

In some embodiments, the indication of the external repository is received/specified/identified as part of a request to recover the virtual machine. In some embodiments, the processor receives an indication of/specifies/identifies the external repository by receiving/issuing a first API call. In some embodiments, receiving an indication of/specifying the external repository enables the processor, or a cluster on which the processor is on, to access data sources (e.g., the data source 111) within the external repository. In some embodiments, the processor exposes the virtual machine image as a virtual disk. In some embodiments, the processor maps/links the virtual machine image to a virtual disk (e.g., virtual machine disk) that is located in the cluster that the process is included in. In some embodiments, the processor specifies a URL of the data source when creating the virtual disk.

The processor powers-on a virtual machine, at operation 220. The processor attaches the virtual machine image to the virtual machine, at operation 230. In some embodiments, the processor exposes and attaches the virtual machine image by issuing a second API call or as part of receiving/issuing the first API call. In some embodiments, the virtual machine image is attached to the virtual machine after the virtual machine is powered-on. In some embodiments, a first portion of the virtual machine image is attached to the virtual machine before the virtual machine is powered-on, and a second portion of the virtual machine image is attached to the virtual machine after the virtual machine is powered-on.

Figure 3:
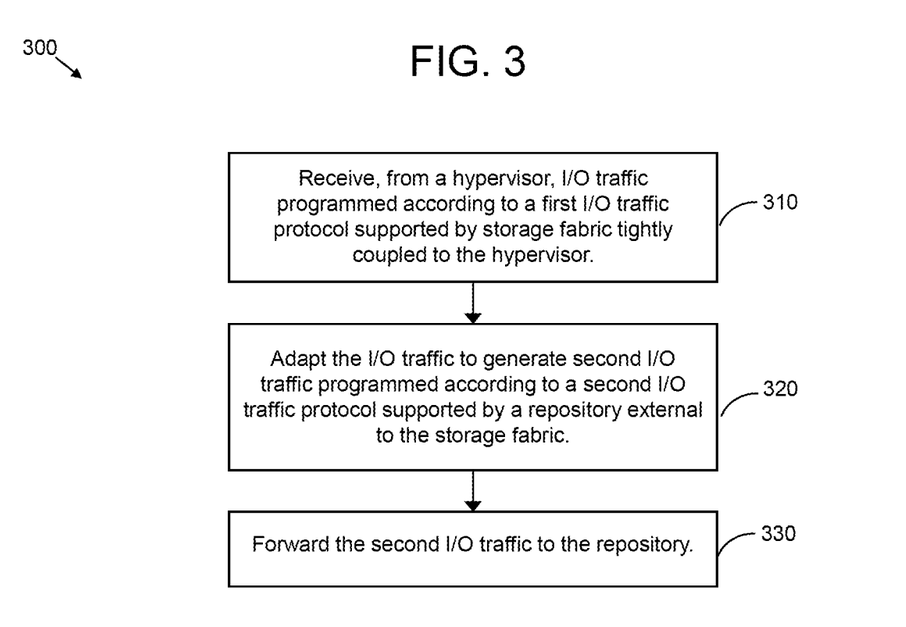
FIG. 3 is a flowchart of an example method is illustrated, in accordance with some embodiments of the present disclosure.

Referring now to FIG. 3, a flowchart of an example method 300 is illustrated, in accordance with some embodiments of the present disclosure. The method 300 may be implemented using, or performed by, the network environment 100, one or more components of the network environment 100, a processor associated with the network environment 100, or a processor associated with the one or more components of network environment 100. Additional, fewer, or different operations may be performed in the method 300 depending on the embodiment. One or more operations of the method 300 may be combined with one or more operations of the method 200.

A processor (e.g., the storage fabric adapter 114, the vdisk controller 116, the external repository adapter 118, or a combination thereof) receives, from a hypervisor (e.g., the hypervisor 104), a workload (e.g., the workload 102) or substrate recovered/launched/powered on by the hypervisor, I/O traffic (e.g., read request, write request) programmed according to a first I/O traffic protocol (e.g., iSCSI or native protocol) supported by a cluster-wide storage fabric (e.g., the storage fabric 108) exposed to the workload as being hosted on the same host that the workload or substrate is on, at operation 310. In some embodiments, the workload or substrate is an instantly recovered workload or substrate. In some embodiments, the workload or substrate is recovered by a hypervisor hosted on a host of a cluster of hosts.

In some embodiments, the storage fabric is tightly coupled to the hypervisor. In some embodiments, the storage fabric and the hypervisor form an HCI or HCI unit. In some embodiments, the storage fabric and the hypervisor are part of an HCI cluster (e.g., hyperconverged cluster of hosts). In some embodiments, the processor identifies that a destination of the I/O traffic is a repository (e.g., the external repository 110) external to the storage fabric.

In some embodiments, the processor exposes the repository as a virtual disk. In some embodiments, the processor exposes the data source of the repository as a virtual disk. In some embodiments, the processor identifies a virtual disk (e.g., the virtual disk 115) from the I/O traffic and maps the virtual disk to a URL of a data source. In some embodiments, the processor identifies the URL of the data source from the I/O traffic.

The processor adapts/converts/translates the I/O traffic to generate second I/O traffic programmed according to a second I/O traffic protocol supported by the repository external to the storage fabric, at operation 320. The processor forwards the second I/O traffic to the repository, at operation 330.

In some embodiments, the data source 111 is passed through (e.g., exposed) as a first virtual disk to the workload 102 on the hypervisor 104 (e.g., the first virtual disk is created and mapped to the data source 111). The first virtual disk can reside in, or be associated with, the virtual disk controller 116. This type of data source may be referred to as a passthrough data source (e.g., passthrough external data source) and a process of reading/writing for a workload using a passthrough data source may be referred to as forwarding or passing through. In some embodiments, the processor (e.g., the external repository adapter 118) translates a read/write request from a first protocol to a second protocol and forwards the read/write request to the (e.g., from the first virtual disk) data source 111. In some embodiments, the processor adapts the I/O traffic in the first virtual disk to generate the second I/O traffic. In some embodiments, passthrough data sources are used for ephemeral virtual machines (e.g., ephemeral virtual machine disks) or CD-ROM optical disk images (ISOs).

In some embodiments, the processor (e.g., the virtual disk controller 116) creates one or more additional virtual disks (e.g., virtual machine disks) that are mapped/linked to the first virtual disk backed by the data source 111. The one or more additional virtual disks can reside in, or be associated with, the virtual disk controller 116. This type of data source may be referred to as a fast-cloned data source (e.g., fast-cloned external data source) and a process of reading/writing for a workload using a fast-cloned data source may be referred to as fast-cloning or absorbing. The virtual disk exposing the fast-cloned data source may be referred to as a parent vdisk and each of the one or more additional virtual disks may be referred to as a child vdisk. In some embodiments, the processor clones the I/O traffic from the first virtual disk (e.g., the child vdisk) to a second virtual disk (e.g., the parent vdisk). In some embodiments, the processor adapts the I/O traffic in the second virtual disk to generate the second I/O traffic.

In some embodiments, the virtual disk controller 116 writes to the child vdisk (e.g., the child disk absorbs the writes to the fast-cloned data source, foreground write). In some embodiments, the processor clones the I/O traffic from the virtual disk (e.g., the child virtual disk) to a second virtual disk (e.g., the parent virtual disk). In some embodiments, the virtual disk controller 116 determines if reads can be serviced locally (e.g., if data on the fast-cloned data source is also located in storage/memory/cache in the storage fabric 108 such as the child vdisk). In some embodiments, if the virtual disk controller 116 determines that the reads cannot be serviced locally (e.g., if a requested range is unavailable), the external repository adapter 118 translates and forwards the read request to the data source 111 (e.g., from the parent vdisk). Otherwise, the data can be read locally in the child vdisk (e.g., foreground read).

Figure 4:
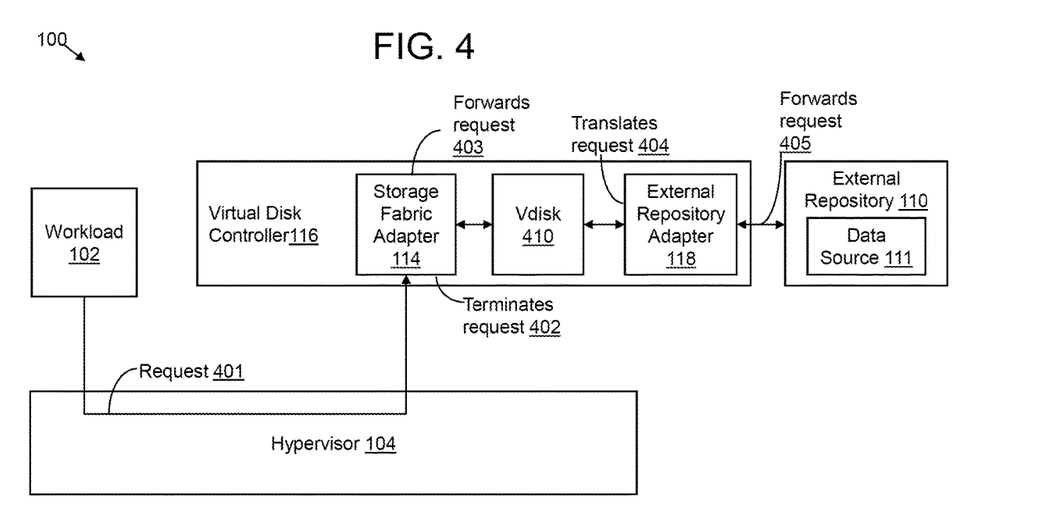
FIG. 4 is an example block diagram of the network environment of FIG. 1 that illustrates forwarding requests, in accordance with some embodiments of the present disclosure.

FIG. 4 is an example block diagram of the network environment 100 that illustrates forwarding requests, in accordance with some embodiments of the present disclosure. In some embodiments, forwarding can occur for a passthrough data source. At operation 401, the workload 102 sends the request (e.g., an iSCSI request), via the hypervisor 104, to the virtual disk controller 116, which includes the storage fabric adapter 114, the vdisk 410, and the external repository adapter 118. The workload 102 can be hosted on a virtual machine or container. The request may specify the vdisk 410 as the recipient, and the vdisk 410 may be backed by the data source 111. At operation 402, the storage fabric adapter 114 receives and terminates the request (e.g., removes any iSCSI-related headers, etc.). At operation 403, the storage fabric adapter 114 forwards the (e.g., stripped-down) request to the vdisk 410. In some embodiments, the storage fabric adapter 114 translates the request into a request in an HCI-native format that can be interpreted by the vdisk 410. The request can pass through the vdisk 410 and the external repository adapter 118 can receive the request. At operation 404, the external repository adapter 118 translates the request to a request that is supported by the external repository 110. At operation 405, the external repository adapter 118 forwards the translated request to the data source 111.

Figure 5:
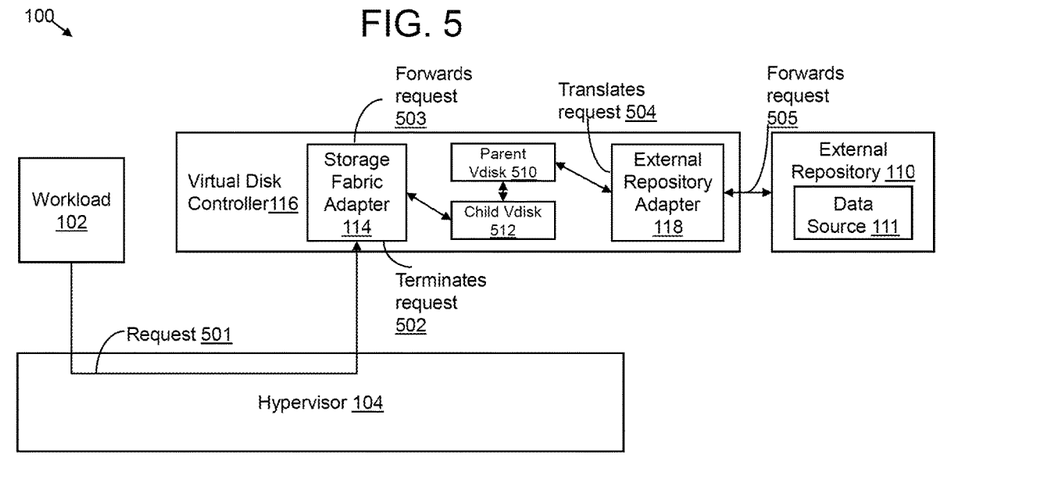
FIG. 5 is an example block diagram of the network environment of FIG. 1 that illustrates servicing requests using a fast clone, in accordance with some embodiments of the present disclosure.

FIG. 5 is an example block diagram of the network environment 100 that illustrates servicing requests using a fast clone, in accordance with some embodiments of the present disclosure. In some embodiments, an I/O request is locally absorbed by the fast clone if the I/O request is (a) a read request in which the data is available locally, or (b) a write request. In some embodiments, forwarding to the external repository can occur for a read request on a fast-cloned data source where the data to be read is not available locally. The operations 501 and 502 are similar to the operations 401 and 402 of FIG. 4. At operation 503, the storage fabric adapter 114 forwards a request to the child vdisk 512. In some embodiments, the request includes instructions for whether to absorb locally or forward the request. Additionally or alternatively, in some embodiments, if the request is a read, the storage fabric adapter 114 may indicate to absorb the read locally. In some embodiments, if the child vdisk 512 returns, to the storage fabric adapter 114, a cache miss for the requested data on a cache associated with the child vdisk 512, and the storage fabric adapter 114 sends instructions to the child vdisk 512 to forward the request to the parent vdisk 510. If the request is forwarded to the parent vdisk 510, then operations 504 and 505 are performed. The operations 504 and 505 are similar to the operations 404 and 405 of FIG. 4.

In some embodiments, the virtual disk controller 116 includes mechanisms for protecting the storage fabric 108. In some embodiments, the virtual disk controller 116 prevents zero-filling the empty regions or incomplete blocks of disks during writes and copy block map operations. In some embodiments, read ahead, deduplication, coalescing and creation of merged vblocks are delayed until storage migration, which is discussed below, is complete. Herein, a vblock can refer to a block of a virtual disk.

In some embodiments, the virtual disk controller 116 can handle issues arising out of inconsistent caches in various hosts of the HCI cluster due to managing data disks originating on external repositories. In some embodiments, on encountering an absence of vblock metadata, the range is forwarded to the root/parent vdisk. Using the feedback from the forwarded request, the cache can be cleared on the original node. In some embodiments, the virtual disk controller 116 clears the vblock map cache entries on a node before hosting a data source vdisk. In some embodiments, once the storage migration is complete, the virtual disk controller 116 clears the vblock map cache entries on nodes for data source vdisks before updating their configurations. In some embodiments, fast-cloned external data sources support foreground migration, background migration, snapshots, clones, and back-ups of virtual disks. In some embodiments, the processes passing through and fast cloning can be performed together (e.g., mirroring).

In some embodiments, the virtual disk controller 116 live migrates disk data of the external repository 110 to the storage fabric 108 without interruption to the recovered workload 102. In some embodiments, the storage migration is performed on page boundaries with a predetermined page size (e.g., 1 MB). For every vblock that is being fetched from the external repository 110, there can be a metadata update. The fetched data can be written to the storage fabric 108 (e.g., an extent store). Advantageously, having metadata updates prevents future requests to that region from being forwarded to the external repository 110. In some embodiments, storage migration is performed if a predetermined amount of storage is available in the storage fabric 108. In some embodiments, a number of pages migrated in parallel is controlled per data source.

In some embodiments, storage migration (e.g., foreground migration) is initiated by read requests from the running workload 102. The data source 111 can be represented by one or more regions (e.g., blocks, vblocks, extents, etc.). In some embodiments, a read request to the data source 111 causes a foreground migration of the region associated with the read request. In some embodiments, the virtual disk controller 116 makes a determination on whether to perform a foreground migration based on one or more of (a) a foreground read size, (b) a max read I/O size supported by the external storage system, (c) a current load on the extent store, or (d) available storage space in the cluster.

Referring to FIG. 1, in some embodiments, the network environment 100 includes a control plane 120. In some embodiments, the control plane 120 provisions passthrough and fast-cloned data sources in the cluster that the host 101 is a part of. In some embodiments, the control plane 120 administers foreground and background policies for fast-cloned data sources. In some embodiments, the control plane 120 manages a lifecycle of data sources.

In some embodiments, the control plane 120 initiates/manages/drives storage migration (e.g., background migration). In some embodiments, managing the background migration includes setting polices for one or more of enabling background migration, suspending background migration, or resuming background migration. The control plane 120 and/or an administrator can control what state a background migration is in. The state of a background migration can include one or more of disabled, enabled, running, suspended, or completed.

The network environment 100 may include (e.g., run on) one or more clusters of nodes (e.g., hosts, computers, machines). Each node may include one or more virtualized workloads (one or more virtual machines, containers, virtual disks, etc.) that run services/applications/operating systems by using storage and compute resources virtualized through the hypervisor (e.g., KVM, AHV, ESXi, Hyper-V, etc.) and distributed across the cluster. The cluster of nodes may be in one data center (on-premises), in a cloud, (off-premises), or distributed across one or more of multiple data centers, multiple clouds, or a hybrid of data centers and clouds. At least one of the workloads (e.g., a controller virtual machine or container) in the cluster or one of the hypervisors may run core services that manages and maintains the cluster or the workloads. The core services may include a cluster manager, a health/wellness check manager, an I/O storage manager, and the like. In some embodiments, the core services manage multiple clusters.

Each of the components (e.g., elements, entities) of the network environment 100 (e.g., the host 101, the workload 102, the hypervisor 104, the software stack 106, the storage fabric 108, the virtual disk controller 116, the storage fabric adapter 114, the virtual disk controller 116, and the external repository adapter 118), is implemented using hardware, software, or a combination of hardware or software, in one or more embodiments. Each of the components of the network environment 100 may be a processor with instructions or an apparatus/device (e.g., server) including a processor with instructions, in some embodiments. In some embodiments, multiple components may be part of a same apparatus and/or processor. Each of the components of the of the network environment 100 can include any application, program, library, script, task, service, process or any type and form of executable instructions executed by one or more processors, in one or more embodiments. Each of the one or more processors is hardware, in some embodiments. The instructions may be stored on one or more computer readable and/or executable storage media including non-transitory storage media.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A non-transitory computer readable medium comprising instructions that, when executed by a processor, cause the processor to:
receive, from a workload hosted on a host of a cluster comprising a plurality of hosts, wherein the workload is recovered and launched by a hypervisor hosted on the same host, first I/O traffic of the recovered workload programmed according to a first I/O traffic protocol supported by a cluster-wide storage fabric shared across the plurality of hosts, the storage fabric exposed to the recovered workload as being hosted on the same host by a virtual disk controller which virtualizes storage resources of the storage fabric;
adapt the first I/O traffic to generate second I/O traffic of the recovered workload programmed according to a second I/O traffic protocol supported by a repository external to the storage fabric and the cluster of hosts, wherein the repository is not virtualized by the virtual disk controller; and
forward the second I/O traffic of the recovered workload to the repository.

2. The medium of claim 1, comprising the instructions stored thereon that, when executed by the processor, further cause the processor to:
expose a data source of the repository as a virtual disk.

3. The medium of claim 2, comprising the instructions stored thereon that, when executed by the processor, further cause the processor to:
map the virtual disk to a uniform resource locator (URL) of the data source.

4. The medium of claim 2, comprising the instructions stored thereon that, when executed by the processor, further cause the processor to:
adapt the first I/O traffic in the virtual disk to generate the second I/O traffic.

5. The medium of claim 2, comprising the instructions stored thereon that, when executed by the processor, further cause the processor to:
clone the first I/O traffic from the virtual disk to a second virtual disk; and
adapt the first I/O traffic in the second virtual disk to generate the second I/O traffic.

6. The medium of claim 1, wherein the recovered workload is instantly recovered by immediately restoring the workload from a data source of the repository.

7. The medium of claim 1, wherein the recovered workload is instantly recovered from one or more snapshots stored on a data source of the repository.

8. The medium of claim 1, wherein the hypervisor, the virtual disk controller and the storage fabric are tightly coupled in a hyperconverged infrastructure.

9. An apparatus comprising a processor and a memory, wherein the memory includes programmed instructions that, when executed by the processor, cause the apparatus to:
receive, from a workload hosted on a host of a cluster comprising a plurality of hosts, wherein the workload is recovered and launched by a hypervisor hosted on the same host, first I/O traffic of the recovered workload programmed according to a first I/O traffic protocol supported by a cluster-wide storage fabric shared across the plurality of hosts, the storage fabric exposed to the recovered workload as being hosted on the same host by a virtual disk controller which virtualizes storage resources of the storage fabric;
adapt the first I/O traffic to generate second I/O traffic of the recovered workload programmed according to a second I/O traffic protocol supported by a repository external to the storage fabric and the cluster of hosts, wherein the repository is not virtualized by the virtual disk controller; and
forward the second I/O traffic of the recovered workload to the repository.

10. The apparatus of claim 9, wherein the memory includes the programmed instructions that, when executed by the processor, further cause the apparatus to:
expose a data source of the repository as a virtual disk.

11. The apparatus of claim 10, wherein the memory includes the programmed instructions that, when executed by the processor, further cause the apparatus to:
map the virtual disk to a uniform resource locator (URL) of the data source.

12. The apparatus of claim 10, wherein the memory includes the programmed instructions that, when executed by the processor, further cause the apparatus to:
adapt the first I/O traffic in the virtual disk to generate the second I/O traffic.

13. The apparatus of claim 10, wherein the memory includes the programmed instructions that, when executed by the processor, further cause the apparatus to:
clone the first I/O traffic from the virtual disk to a second virtual disk; and
adapt the first I/O traffic in the second virtual disk to generate the second I/O traffic.

14. The apparatus of claim 9, wherein the recovered workload is instantly recovered by immediately restoring the workload from a data source of the repository.

15. The apparatus of claim 9, wherein the recovered workload is instantly recovered from one or more snapshots stored on a data source of the repository.

16. The apparatus of claim 9, wherein the hypervisor, the virtual disk controller and the storage fabric are tightly coupled in a hyperconverged infrastructure.

17. A computer-implemented method comprising:
receiving, from a workload hosted on a host of a cluster comprising a plurality of hosts, wherein the workload is recovered and launched by a hypervisor hosted on the same host, first I/O traffic of the recovered workload programmed according to a first I/O traffic protocol supported by a cluster-wide storage fabric shared across the plurality of hosts, the storage fabric exposed to the recovered workload as being hosted on the same host by a virtual disk controller which virtualizes storage resources of the storage fabric;
adapting the first I/O traffic to generate second I/O traffic of the recovered workload programmed according to a second I/O traffic protocol supported by a repository external to the storage fabric and the cluster of hosts, wherein the repository is not virtualized by the virtual disk controller; and
forwarding the second I/O traffic of the recovered workload to the repository.

18. The method of claim 17, further comprising:
exposing a data source of the repository as a virtual disk.

19. The method of claim 18, further comprising:
mapping the virtual disk to a uniform resource locator (URL) of the data source.

20. The method of claim 18, further comprising:
adapting the first I/O traffic in the virtual disk to generate the second I/O traffic.

21. The method of claim 18, further comprising:
cloning the first I/O traffic from the virtual disk to a second virtual disk; and adapting the first I/O traffic in the second virtual disk to generate the second I/O traffic.

22. The method of claim 17, wherein the recovered workload is instantly recovered by immediately restoring the workload from a data source of the repository.

23. The method of claim 17, wherein the recovered workload is instantly recovered from one or more snapshots stored on a data source of the repository.

24. The method of claim 17, wherein the hypervisor, the virtual disk controller and the storage fabric are tightly coupled in a hyperconverged infrastructure.

* * * * *